Figure 1:
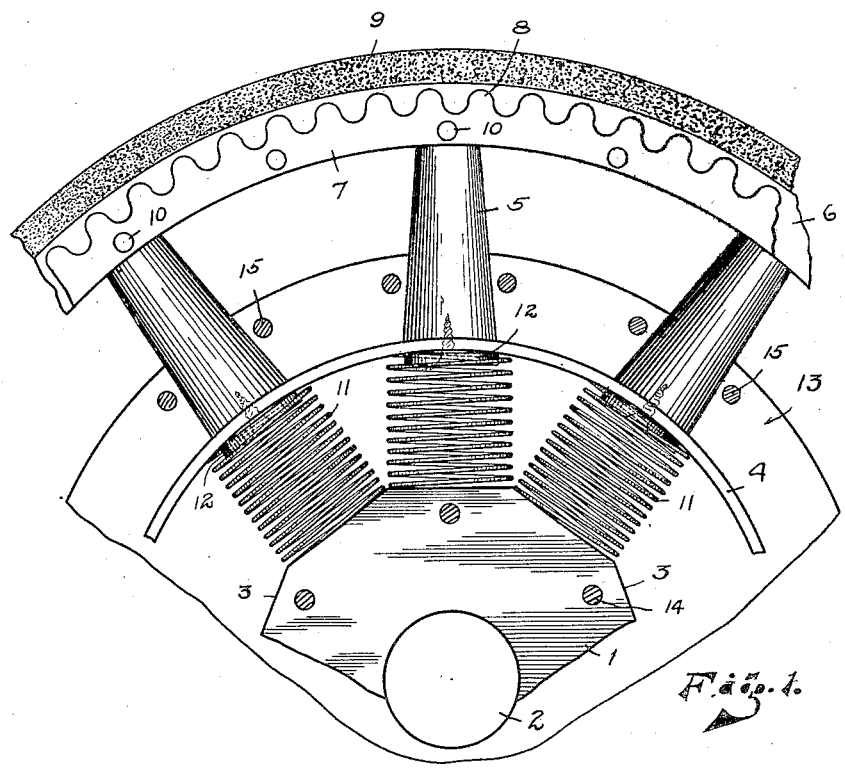

Jan. 9, 1923.

A. J. BENTFIELD.
RESILIENT WHEEL.
FILED MAY 1, 1922.

1,441,553.

Inventor
Anton J. Bentfield,

Attorney

Patented Jan. 9, 1923.

1,441,553

UNITED STATES PATENT OFFICE.

ANTON J. BENTFIELD, OF BARNUM, MINNESOTA.

RESILIENT WHEEL.

Application filed May 1, 1922. Serial No. 557,581.

*To all whom it may concern:*

Be it known that I, ANTON J. BENTFIELD, a citizen of the United States, residing at Barnum, in the county of St. Louis and State of Minnesota, have invented certain new and useful Improvements in Resilient Wheels, of which the following is a specification, reference being had therein to the acompanying drawing.

This invention relates to resilient wheels for vehicles the principal object of which is to provide a practical and efficient wheel of this type.

Other objects and advantages of the invention will appear in the further description thereof.

Figure 2:
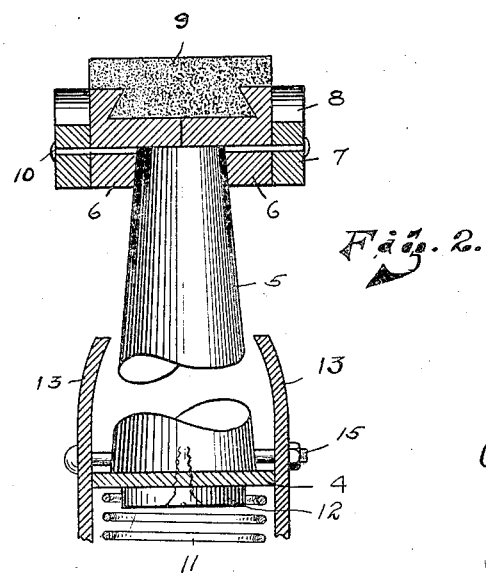

Referring to the accompanying drawings forming part of this application in which like reference characters indicate like parts:

Figure 1 is a fragmental portion of one of my improved wheels shown in elevation, and Figure 2 is an enlarged transverse section through the felly portion and inner rim of the wheel.

1 represents the disc like hub of the wheel having an axial bore or hole 2 therethrough. This disc may be of wood or fabricated structure, but preferably having a plurality of flattened faces upon its circumferential edge as at 3. Concentric with the hub 1 and spaced therefrom is an inner annular band or rim 4 onto which are securely fastened in any desired manner the radially disposed spokes 5, they carrying upon their outermost ends the two-part separable felly 6. This felly is preferably constructed of wood or similar light material and carries upon either side thereof a metal annular cogged rack 7 the cogs being illustrated at 8, and may be of any desired shape or depth, but the protruding ends of which do not extend outwardly as far as the ultimate tread of the tire of the wheel, which latter is shown at 9 and may be of hard rubber or other suitable material. The tread of the tire is shown as being of dovetail construction in cross section, and engaged intermediate of the separable parts of the felly 6.

The parts of the felly 6, together with the annular racks 7, there being one of these upon either side of the felly, are united in any desired manner by through bolts or rivets 10.

Intermediate of the hub 1 and the inner rim 4 are expansive springs 11, there being one impinged against each flat surface of said hub at one end while the other ends surround a projecting hub or disc 12 which are held in position by the pin or bolt holding each spoke 5 to the rim 4, or the end of the spokes may be allowed to protrude through the inner rim, if desired, for such holding purpose.

As protection for the spring arrangement of the wheel against dislocation and as upright support for the wheel there is provided two discs 13, one upon either side of the inner rim 4 and hub 1, they being held tightly against the sides of the hub 1 by suitable through bolts 14. Other throughbolts 15 are employed outside of the rim 4 and adjacent the spokes 5 to prevent independent rotary motion of the hub or felly portions.

It is to be understood that various modifications within the scope of the appended claims may be resorted to without departing from the spirit of the invention, and having thus described the same, what I claim and desire to secure by Letters Patent is:

1. A resilient wheel of the character described comprising in combination a solid disc like hub having a plurality of flat circumferential faces, an annular band or rim spaced from said hub and concentric therewith, a tire carrying felly spaced from and concentric with the rim, rigid spokes intermediate of the rim and the felly, each spoke being aligned with its respective flat surface on the hub, a resilient expansive spring intermediate of the rim and the hub radially aligned with each spoke, encasing discs on either side of the rim and the hub extending outwardly beyond the former, and means for holding them tightly impinging the latter but movable radially independently of the "former."

2. A resilient wheel of the character described comprising in combination a solid disc like hub having a plurality of flat circumferential faces, an annular band or rim spaced from said hub and concentric therewith, a tire carrying felly spaced from and concentric with the rim, rigid spokes intermediate of the rim and the felly, each spoke being aligned with its respective flat surface on the hub, a resilient expansive spring intermediate of the rim and the hub radially aligned with each spoke, encasing discs on either side of the rim and the hub extending outwardly beyond the former, means for holding them tightly impinging the latter but movable radially independently of the former, and means in that portion of the encasing discs beyond the rim for engagement with the spokes to prevent abnormal circumferential movement of the felly independently of the hub, substantially as described.

In testimony whereof I hereunto affix my signature in the presence of two witnesses.

ANTON J. BENTFIELD.

Witnesses:
F. E. BAUER,
C. A. MINER.